US012671188B2

(12) United States Patent
Hongnara et al.

(10) Patent No.: US 12,671,188 B2
(45) Date of Patent: Jun. 30, 2026

(54) REFLECT ARRAY, DESIGN METHOD FOR REFLECT ARRAY, AND REFLECT ARRAY SYSTEM

(71) Applicant: DKK Company, Limited, Tokyo (JP)

(72) Inventors: Tanan Hongnara, Tokyo (JP); Takayoshi Sasaki, Tokyo (JP); Yoshiki Shirasawa, Tokyo (JP); Katsumori Sasaki, Tokyo (JP); Keisuke Sato, Tokyo (JP)

(73) Assignee: DKK Company, Limited, Tokyo (JP)

( * ) Notice: Subject to any disclaimer, the term of this patent is extended or adjusted under 35 U.S.C. 154(b) by 153 days.

(21) Appl. No.: 18/271,688

(22) PCT Filed: Jan. 12, 2022

(86) PCT No.: PCT/JP2022/000791

§ 371 (c)(1),
(2) Date: Jul. 11, 2023

(87) PCT Pub. No.: WO2022/154022

PCT Pub. Date: Jul. 21, 2022

(65) Prior Publication Data

US 2024/0322443 A1 Sep. 26, 2024

(30) Foreign Application Priority Data

Jan. 12, 2021 (JP) ................................ 2021-002802

(51) Int. Cl.
*H01Q 15/14* (2006.01)
*H01Q 19/10* (2006.01)

(52) U.S. Cl.
CPC .................................. *H01Q 15/14* (2013.01)

(58) Field of Classification Search
CPC ........... H01Q 15/14; H01Q 3/46; H01Q 1/24; H01Q 1/246; H01Q 15/145; H01Q 19/10
See application file for complete search history.

(56) References Cited

U.S. PATENT DOCUMENTS 9,383,441 B2 * 7/2016 Younis .................. H01Q 15/14
10,079,431 B2 * 9/2018 Deng ...................... H01Q 3/16
(Continued)

FOREIGN PATENT DOCUMENTS

JP 2002-333459 A 11/2002
JP 2008-270875 A 11/2008
(Continued)

OTHER PUBLICATIONS

Hongnara, Tanan et al., "Dual-Polarized Reflective Metasurface Based on Cross-Shaped Resonator for 5G Wireless Communication Systems at 28 GHz," 2019 International Symposium on Antennas and Propagation (ISAP), Xi'an, China, 2019, pp. 1-2.
(Continued)

*Primary Examiner* — Tho G Phan
(74) *Attorney, Agent, or Firm* — Faegre Drinker Biddle & Reath LLP

(57) ABSTRACT

The present invention addresses the problem of high costs resulting from the necessity of a variety of reflector design parameters due to area size and distance of transmission/reception and reflectors. A design method for a reflect array that transmits, to a reception region, radio waves from a base station used in communications, said method comprising: a gain setting step for setting necessary gain; a width setting step for setting a necessary beam width; a preparation step for preparing a plurality of reflectors having differing reflection directions from each other; and an arrangement step for arranging the plurality of reflector such that the beams formed by the plurality of reflectors satisfy the necessary beam width as a whole.

11 Claims, 13 Drawing Sheets

(56) References Cited

U.S. PATENT DOCUMENTS

| | | | | |
|---|---|---|---|---|
| 10,419,948 | B1 * | 9/2019 | Labadie | H01Q 3/005 |
| 11,019,506 | B2 * | 5/2021 | Wu | H01Q 19/10 |
| 11,101,550 | B2 * | 8/2021 | Lee | H01Q 1/246 |
| 11,233,338 | B2 * | 1/2022 | Zhang | H01Q 19/10 |
| 11,342,682 | B2 * | 5/2022 | Pelletti | H01Q 1/007 |
| 2008/0180227 | A1 | 7/2008 | Le et al. | |
| 2008/0182528 | A1 | 7/2008 | Le | |
| 2008/0182583 | A1 | 7/2008 | Le et al. | |
| 2008/0182584 | A1 | 7/2008 | Le | |
| 2011/0045764 | A1 | 2/2011 | Maruyama et al. | |
| 2012/0303328 | A1 | 11/2012 | Maruyama et al. | |
| 2015/0155636 | A1 | 6/2015 | Maruyama et al. | |
| 2019/0230523 | A1 | 7/2019 | Akhter et al. | |

FOREIGN PATENT DOCUMENTS

| | | | |
|---|---|---|---|
| JP | 2009-225082 | A | 10/2009 |
| JP | 2010-518700 | A | 5/2010 |
| JP | 2014-030139 | A | 2/2014 |
| WO | WO-2009/069780 | A1 | 6/2009 |
| WO | WO-2011/068224 | A1 | 6/2011 |
| WO | WO-2013/136835 | A1 | 9/2013 |

OTHER PUBLICATIONS

Written Opinion of the International Searching Authority mailed Apr. 5, 2022 for PCT/JP2022/000791.

Japanese Decision to Grant a Patent issued Sep. 25, 2024 in Application No. 2021-002802.

* cited by examiner

REFLECT ARRAY, DESIGN METHOD FOR REFLECT ARRAY, AND REFLECT ARRAY SYSTEM

TECHNICAL FIELD

The present invention relates to a reflect array, a design method of a reflect array, and a reflect array system.

BACKGROUND ART

In communication technology standard such as 5G for telecommunication, higher frequencies is utilized, so radio waves travel more straight compared to the case in 4G. Therefore, in such cases like there is an obstacle between a base station and a communication terminal, it will be difficult for radio waves to reach behind the obstacle, in the future.

As one method for solving this problem, it is conceivable to place a reflector between the base station and the terminal (Non-Patent Document 1).

Antennas whose aperture size cannot be ignored, are assumed to be used in the far field (distant area), and are usually designed under the far field condition. Here, in general, the far field condition where far field and near field (close region) are discriminated by the distance defined by $2 \times D \times D / \lambda$, where D is the size of the reflector and $\lambda$ is the wavelength of the reflected electromagnetic wave, and the far field indicates a region at least $2 \times D \times D / \lambda$ away from the antenna.

The gain of the reflector is determined by the area of the reflector, the beam width which depend on reflection directivity, and the loss. The beam width depending on the reflection directivity must be designed according to the size of the area. Also, required gain of the reflector must be selected according to the distance between the base station and the reflector and the distance between the reflector and the terminal.

In this way, the gain and reflection directivity required for the reflector must be determined by the distance between the base station, reflector, and terminal, and the size of the target area, but unfortunately, in general case, the beam width is automatically determined when the area of the reflector is determined.

In addition, the reflector has four parameters, that are the angle of the incident wave, the angle of the reflected wave, the beam width, and the required gain, and conventional design method requires a huge variety of reflectors.

PRIOR ART

Patent Literature

Patent Literature 1 Japanese Patent Laid-Open No. 2014-30139

Non-Patent Literature 1 T. Hongnara et al., "Dual-Polarized Reflective Metasurface Based on Cross-Shaped Resonator for 5G Wireless Communication Systems at 28 GHz," 2019 International Symposium on Antennas and Propagation (ISAP), Xi' an, China, 2019, pp. 1-2

SUMMARY OF THE INVENTION

Problems to be Solved by the Invention

Conventionally, it is difficult to adjust the directivity at high gain. Especially in the case of use in the far field, if the reflector plate has high gain, the target area to which the reflected radio waves reach becomes narrow.

At the time of designing the reflect array reflector, first the beam width is determined according to the size of the area, second the required gain and the area of the reflector is determined according to the distance, and third the reflector is designed such that the desired beam width are obtained by the determined area. Various parameters for designing the reflector, required for the size of the area, the sending and the receiving of the radio waves, and the distance to the reflector for transmitting and receiving, lead to high cost.

With conventional reflectors, the beam width is determined when the area of the reflector is determined, so it is difficult to satisfy both the required gain and the required beam width. Controlling the reflection phase of the reflector surface and designing the beam width using reflect array technology, can be a solution for this problem.

Accordingly, an object of the present invention is to solve the problem that the communication area is narrowed by sharp directivity at high gain, and to widen the angle of reflection.

In addition, the present invention aims at achieving both high gain of reflected waves and wide beams by multi-beaming.

A further object of the present invention is to provide wide-angle directivity through area design in the near field calculated from the reflector aperture size.

In addition to this, the task is to solve the problem of high costs due to the need for various reflector design parameters depending on the size of the area and the distance between the transmitter and receiver/reflector.

Means for Solving the Problems

A plurality of narrower beam reflectors that satisfy the required gain, have slightly different reflection phases, and have slightly different reflection directions are prepared and arranged so as to secure the required beam width.

A design method of a reflect array in accordance with an embodiment of the present invention is a design method of a reflect array where the reflect array is configured to transmit radio wave from a base station to a reception area, having, a gain setting step for setting necessary gain, containing both of distance information between the base station and the reflect array, and distance information between the reflect array and the reception area, a width setting step for setting a beam width, the beam width is necessary to cover the reception area a preparation step for preparing a plurality of reflectors having differing reflection direction from each other, and an arrangement step for arranging the plurality of reflector, the arrangement step is executed after the steps for setting and the preparation step, where a beam formed by the plurality of reflectors satisfies the necessary beam width as a whole.

A design method of a reflect array in accordance with an embodiment of the present invention corresponds to the design method of a reflect array described above, wherein, at the preparation step, the plurality of reflectors, having differing reflection directions from each other, comprises identical cells, the same cells are arranged at intervals, the intervals differ from the intervals of the reflectors having differing reflection directions.

A design method of a reflect array in accordance with an embodiment of the present invention corresponds to at least the first design method of a reflect array described above, wherein more than two reflectors, having differing reflection directions from each other, are arranged at the preparation step.

A design method of a reflect array in accordance with an embodiment of the present invention corresponds to either of the first two design methods of a reflect array described above, wherein the width setting step comprises division setting step for dividing the reception area into a plurality of division areas, and associating each division area with each reflector.

A reflect array in accordance with an embodiment of the present invention is the reflect array configured to transmit radio wave to be used for communication, from a base station to the reception area, comprising a plurality of reflectors, wherein the reflector has identical cells arranged at predetermined intervals, at least two of the plurality of reflectors have the identical cells, where the cells of the reflector are arranged at an interval and have a reflection angle, the interval and the reflection angle differ from the other reflector, and the reception areas are formed by using the different reflection angles.

A reflect array in accordance with an embodiment of the present invention corresponds to one of the reflect arrays described above, wherein the reception area is formed by using three or more reflectors having reflection angles that differ by approximately a constant angle.

A design method or a reflect array in accordance with an embodiment of the present invention corresponds to one of the reflect arrays described above, wherein the reflect array is designed by the design method according to one of the design methods described above.

A reflect array in accordance with an embodiment of the present invention corresponds to one of the reflect arrays described above, wherein the reflection directions of the radio waves, reflected on the reflector, have two points that are different from each other by 30 degrees or more on the position of the reflector.

A reflect array in accordance with an embodiment of the present invention corresponds to one of the reflect arrays described above, wherein the plurality of reflectors are discretely arranged.

A reflect array in accordance with an embodiment of the present invention corresponds to one of the reflect arrays described above, wherein the reflector is a metasurface.

A reflect array in accordance with an embodiment of the present invention corresponds to one of the reflect array described above, wherein the reflectors are installed substantially on a plane.

A reflect array in accordance with an embodiment of the present invention corresponds to one of the reflect arrays described above, wherein the reflector includes a metal reflector.

A reflect array in accordance with an embodiment of the present invention corresponds to one of the reflect arrays described above, wherein the reflector is a transmission type configured to be attached to glass.

A reflect array in accordance with an embodiment of the present invention corresponds to one of the reflect arrays described above, wherein the reflector is a wall material fake type such as building material pasted or a signboard fake type.

A reflect array in accordance with an embodiment of the present invention corresponds to one of the reflect arrays described above, wherein the reflector is an inside-cover mounting type.

A reflect array system in accordance with an embodiment of the present invention corresponds to the reflect array system having a plurality of reflect arrays as described above, wherein the average number of reflectors used in each reflect array is M, wherein the total number of types of reflectors, which all N reflect arrays have, is (M×N/5) or less.

Effects of the Invention

In a case where a plurality of narrower beam reflectors that satisfy the required gain, have slightly different reflection phases, and have slightly different reflection directions are prepared and arranged so as to secure the required beam width, number of types of the reflectors can be reduced.

In a case where the width setting step comprises division setting step for dividing the reception area into a plurality of division areas and associating each division area with each reflector, each division area can be designed independently, making the overall design even easier.

In a case where the reflection directions of the radio waves, reflected on the reflector, have two points that are different from each other by 30 degrees or more on the position of the reflector, the radio wave is reflected at a wide angle of 30 degrees or more in the near field, thereby wide-angle directivity can be achieved without reducing the gain.

In a case where the plurality of reflectors are discretely arranged, it is possible to achieve wide-angle directivity by using multiple reflectors instead of a large reflector.

In a case where the reflector is a metasurface, the direction of incidence or reflection of radio waves can be adjusted in a desired direction.

In a case where the reflector is installed on substantially one plane, the entire reflect array can be arranged on substantially one plane.

In a case where the reflector is the metal reflector, costs, including manufacturing, can be reduced, since the metal reflector costs less.

In a case where the reflector of transmissive type configured to be attached to glass, a wide-angle directivity reflect array using indoor glass windows can be realized.

The reflector, which is a wall material fake type such as building material pasted or a signboard fake type, implements a wide-angle directivity reflect array to be used in the city or the like.

The reflector, which is an inside-cover mounting type, implements a wide-angle directional reflect array to be used in various places such as inside the cover.

Since the total number of types of reflectors, which all N reflect arrays have, is (M×N/5) or less, where M is the average number of reflectors used in each reflect array, the designing cost can be reduced by designing with one-fifth or lee of the reflectors compared to the ordinary case where designing with M*N reflect arrays is necessary. Furthermore, since pre-designed reflectors are used in combination, the design cost can be significantly reduced.

DETAILED DESCRIPTION

First, wide-angle beam formation of the reflector 100 will be described.

In some embodiments, a wide-angle beam using multi-beams implements wide-angle beam formation while maintaining the required gain. It should be noted that only horizontal direction may be described for the sake of convenience in some cases at the following description, but two directions of the horizontal and vertical directions or the like, or one direction such as the vertical direction is contained. In addition, although only the reflection direction may be described below, in practice, the invention can be implemented for the incident direction or for both the reflection direction and the incident direction. Furthermore, the reflect array 10 described in this specification and claims includes the reflector 100 having one reflector 100 in addition to the reflector 100 having a plurality of reflectors 100.

In the reflect array 10 and its design method, a plurality of narrower beam reflectors 100 satisfying the required gain and having different reflection directions are prepared and arranged so as to secure the required beam width. This configuration brings advantage that the number of types of reflectors 100 can be reduced.

Figure 1:
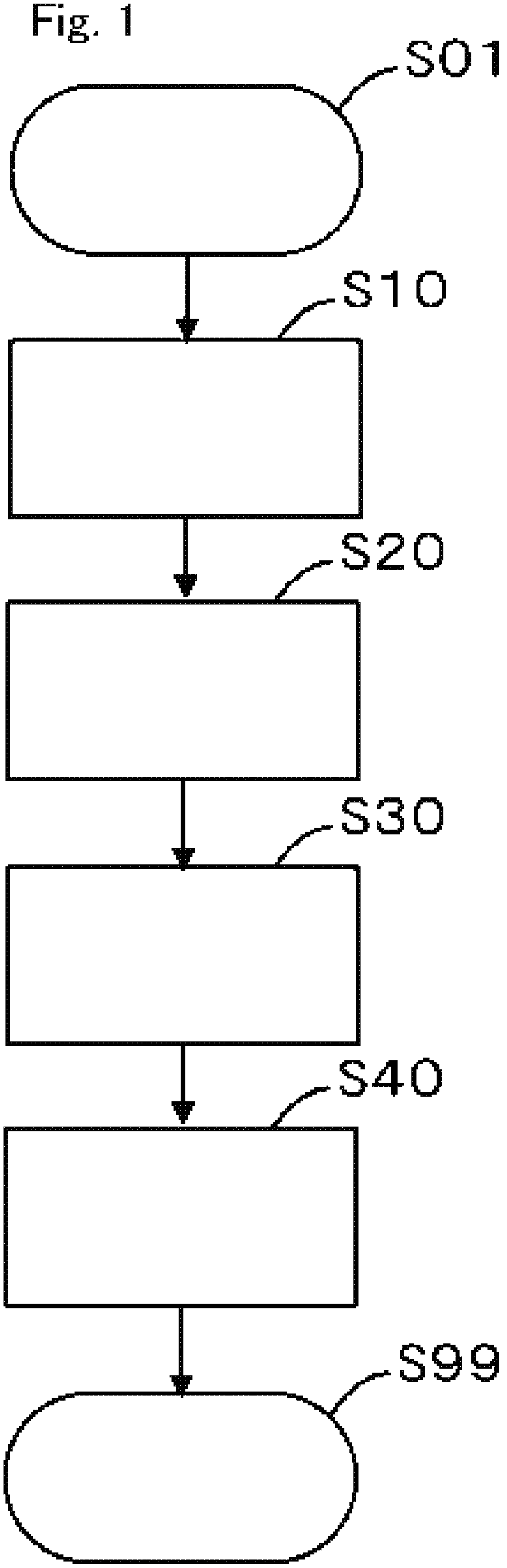
FIG. 1 shows a method of designing a reflect array according to an embodiment of the present invention.

FIG. 1 shows a design method of a reflect array 10 in one embodiment of the present invention.

The reflect array 10 transmits radio waves of 28 GHz or the like from the base station 2 used for communication to the reception area 3, and includes a gain setting step S10, a width setting step S20, a preparation step S30, and an arrangement step S40.

In the gain setting step S10, the necessary gain is determined from information including the distance information between the base station 2 and the reflect array and the distance information between the reflect array 10 and the receiving area 3.

In the width setting step S20, the necessary beam width that covers the reception area 3 is determined.

Figure 2:
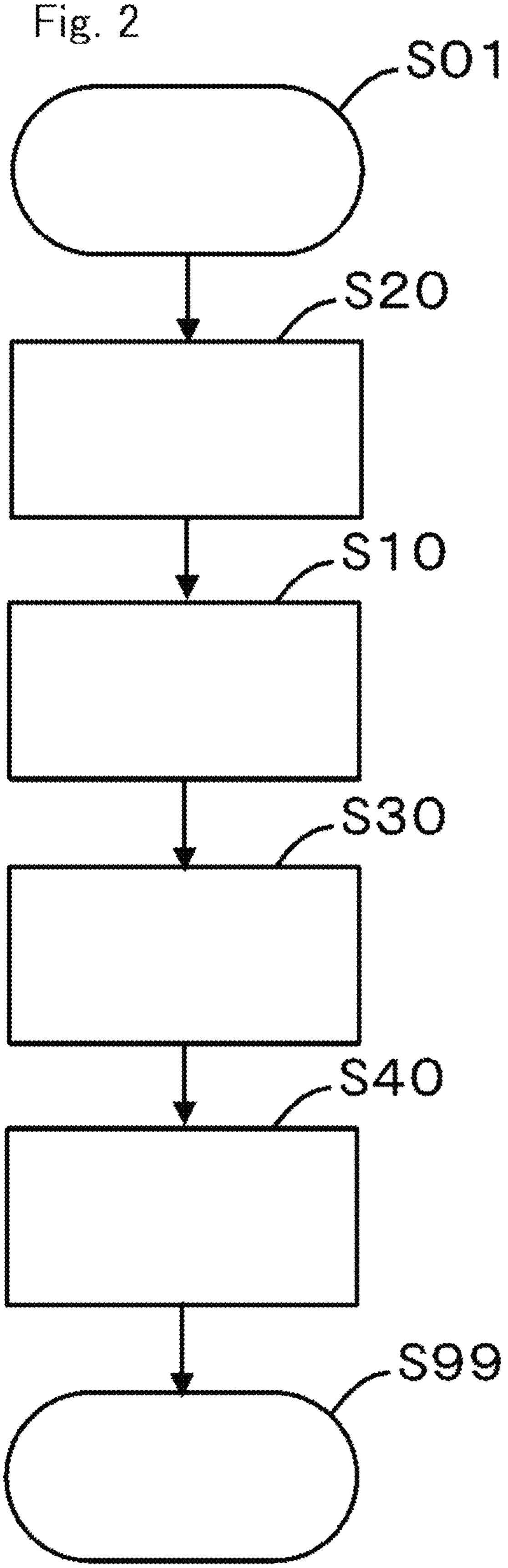
FIG. 2 shows a method of designing a reflect array according to an embodiment of the present invention.

In this embodiment, the gain setting step S10 and the width setting step S20 are performed in that order, but the width setting step S20 and the gain setting step S10 may be performed in that order as shown in FIG. 2, or both two steps may be performed at the same time.

In the preparation step S30, a plurality of reflectors 100 having different reflection directions are prepared. Here, "preparing a plurality of reflectors having differing reflection direction from each other" signifies data preparation, and signifies that the data of the reflectors 100 are aligned.

A placement step S40 is performed after the gain setting step S10, the width setting step S20 and the preparation step S30, and is performed by the plurality of reflectors 100 so that the beam formed by the plurality of reflectors 100 as a whole satisfies the required beam width. Place 100.

Here, "the differing reflection directions from each other" signifies that the reflection directions are different in a certain direction. For example, although the reflection directions are different in the horizontal direction, the reflection directions may be the same in the vertical direction.

In addition, the reception area 3 refers to the range in which radio waves are delivered, including the radio wave concentration area where the radio waves reflected by the reflect array 10 are most concentrated, and refers to the area where existence of target communication terminals etc. is assumed in communication. The radio wave concentration area is an area where the amount of radio waves per unit area, such as 1 square meter, is the densest.

The base station 2 includes one that transmits radio waves for communication.

The phrase "that covers the reception area 3" signifies that most of the receiving area 3 is covered so that there is no problem in communication in practice, and it does not necessarily cover all.

A wide beam is realized by unitizing and arranging the reflectors 100, making the design easier, concerning to the problem that various design parameters of the reflector 100 are required depending on the size of the area and the distance to the reflectors 100 for transmission and reception which leads to high cost. In other words, the design can be facilitated by preparing a plurality of units of reflector plates 100 for narrower beams with different reflection directions that provide the required gain, and by determining the number of units and arranging them so as to obtain the required beam width.

Figure 3:
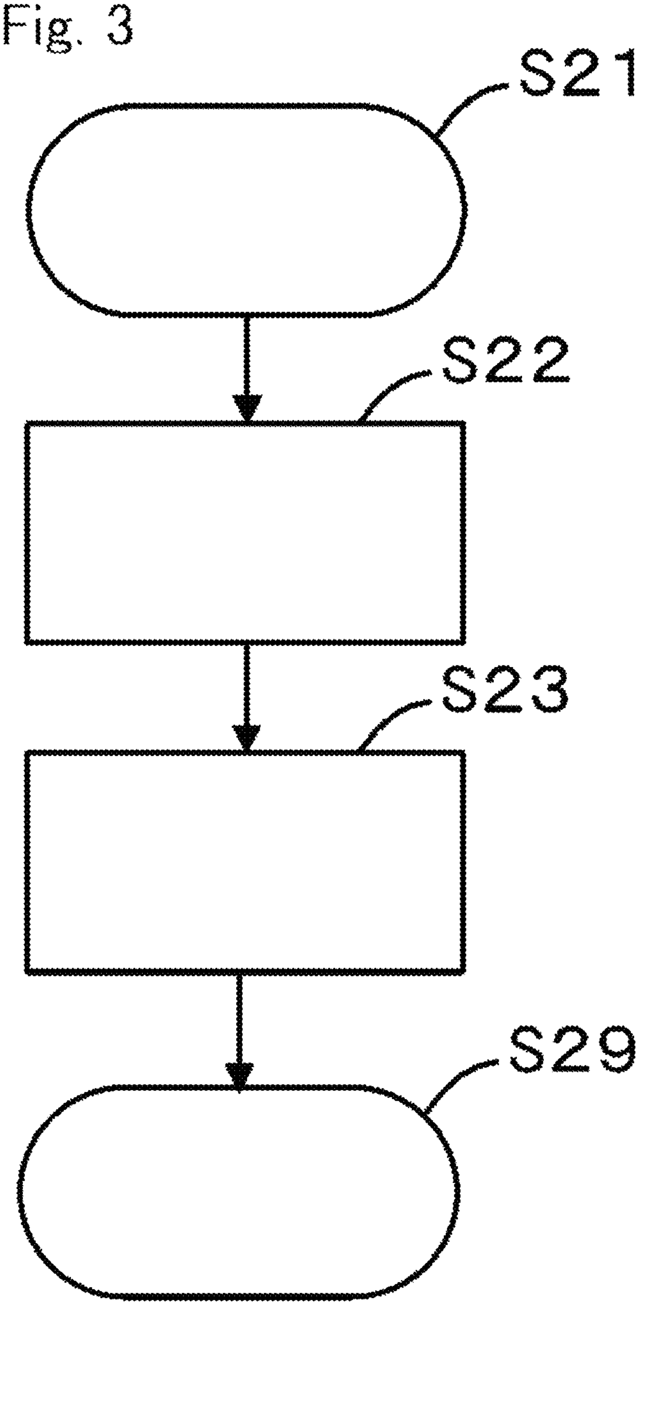
FIG. 3 shows a method of designing a reflect array according to an embodiment of the present invention.

In one embodiment, as shown in FIG. 3, the width setting step S20 may include a division setting step S23 that divides the reception area 3 into a plurality of division areas and associates each division with the reflector 100, as shown in FIG. 3. This embodiment includes a width setting main step S22 and a division setting step S23.

With this design method, each segmented area can be designed independently, making the overall design even easier.

Figure 4:
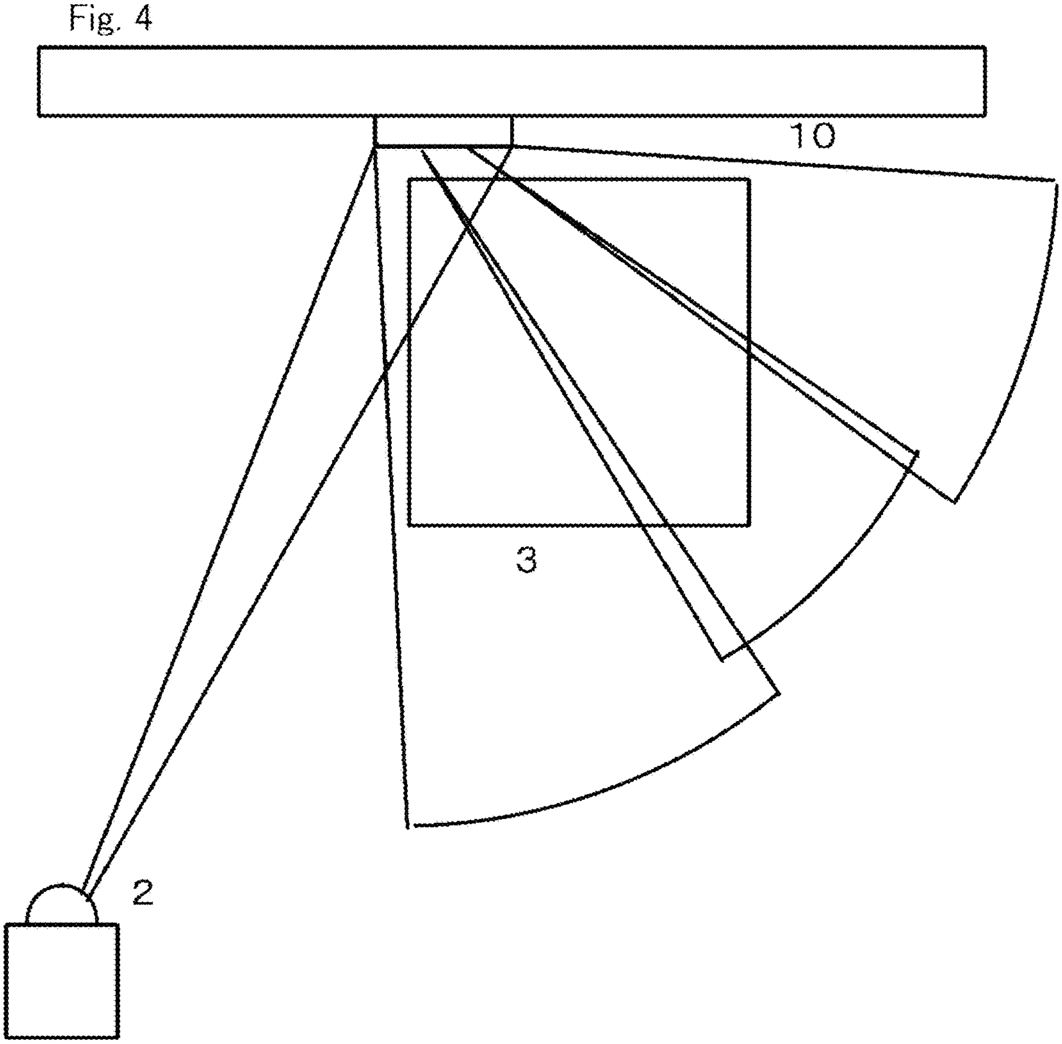
FIG. 4 shows a configuration example of a reflect array in one embodiment of the present invention.

FIG. 4 shows a configuration example of the reflect array 10 in one embodiment of the present invention.

The reflect array 10 transmits radio waves from the base station 2 used for communication to the reception area 3.

The beam to be transmitted has a gain necessary for communication and a beam width that covers the reception area 3.

Figure 5:
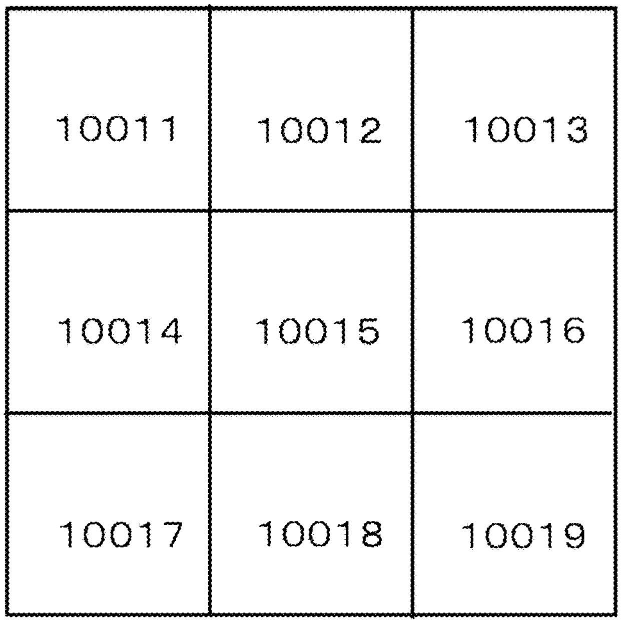
FIG. 5 shows a configuration example of a reflect array in one embodiment of the present invention.

As shown in FIG. 5, the reflect array 10 in this embodiment has a plurality of reflectors (10011 to 10019) having differing reflection direction from each other. The expression that differing reflection direction from each other signifies that the directions of at least two reflectors 100 are different in one of the directions. If the positions of the reflectors 100 are different, it may be possible to efficiently cover the reception area 3 by having the same reflection direction. In this case, the reflectors 100 positioned at different location may have the same reflection direction.

A beam formed by

A plurality of reflectors (10011 to 10019) with differing reflection directions from each other are arranged so that a beam, formed by reflected radio waves from the base station 2, satisfies the necessary beam width as a whole.

The reflect array 10 can be designed by any of the above design methods, or can have another configuration as described later.

Figure 6:
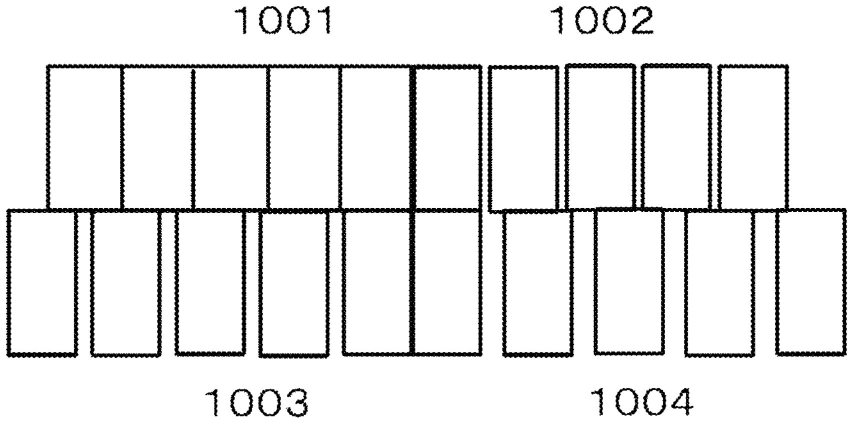
FIG. 6 shows a configuration example of a reflect array in one embodiment of the present invention.

FIG. 6 shows a configuration example of the reflect array 10 in one embodiment of the present invention.

The reflect array 10 has four reflectors (1001-1004). Each reflector has a plurality of identical cells 110 arranged at predetermined intervals, and each has five cells 110 in this embodiment.

Here, identical cells refer to cells that have the same shape and properties. Below, this reflector may be called a super cell.

As a factor that determines the incident angle and reflection angle of the reflector 100, the supercell length is determined from the following formula using the diffraction grating theory.

[Mathmatical Formula 1]

$$D = \frac{m\lambda}{|\sin\theta_i - \sin\theta_r|} \quad (1)$$

where, D is the length of the supercell, m is the order, λ is the wavelength of the reflected electromagnetic wave, theta i($\theta_r$) is the angle of incidence, and theta r($\theta_i$) is the angle of reflection.

In a case where the reflection angle is widened, a supercell is designed and arranged in which the value of theta r is changed from the desired direction at regular intervals. Thus, by designing and arranging supercells with different supercell lengths D and phase gradients, wide-angle reflection characteristics are obtained.

Regarding the reflector 100 with a wide angle in the horizontal plane, if the range of plus/minus 5 degrees is desired with one reflector 100 having beam width in the horizontal plane of 4 degrees, one example of designing can be given where four reflectors with the same incident angle and reflection angles of 57 degrees, 59 degrees, 61 degrees, and 63 degrees are designed and each are designed with the aperture size capable of achieving a desired RCS value (gain). That is, by determining each beam width of the reflector 100 and the number of beams so as to satisfy a desired beam width and combining them into a unit, wide-angle reflection directivity can be realized.

In a case of wide-angle directivity in the vertical plane, when the desired angle is 0 degree in the vertical plane and the beam width in the vertical plane is 4 degrees, and the range of plus/minus 10 degrees is desired to be the communication area, one example of designing can be given where four reflectors with minus 3 degrees, minus 1 degree, plus 1 degree, plus 3 degrees of the maximum directions, are designed with the aperture size that can achieve a desired RCS value (gain).

Figure 7:
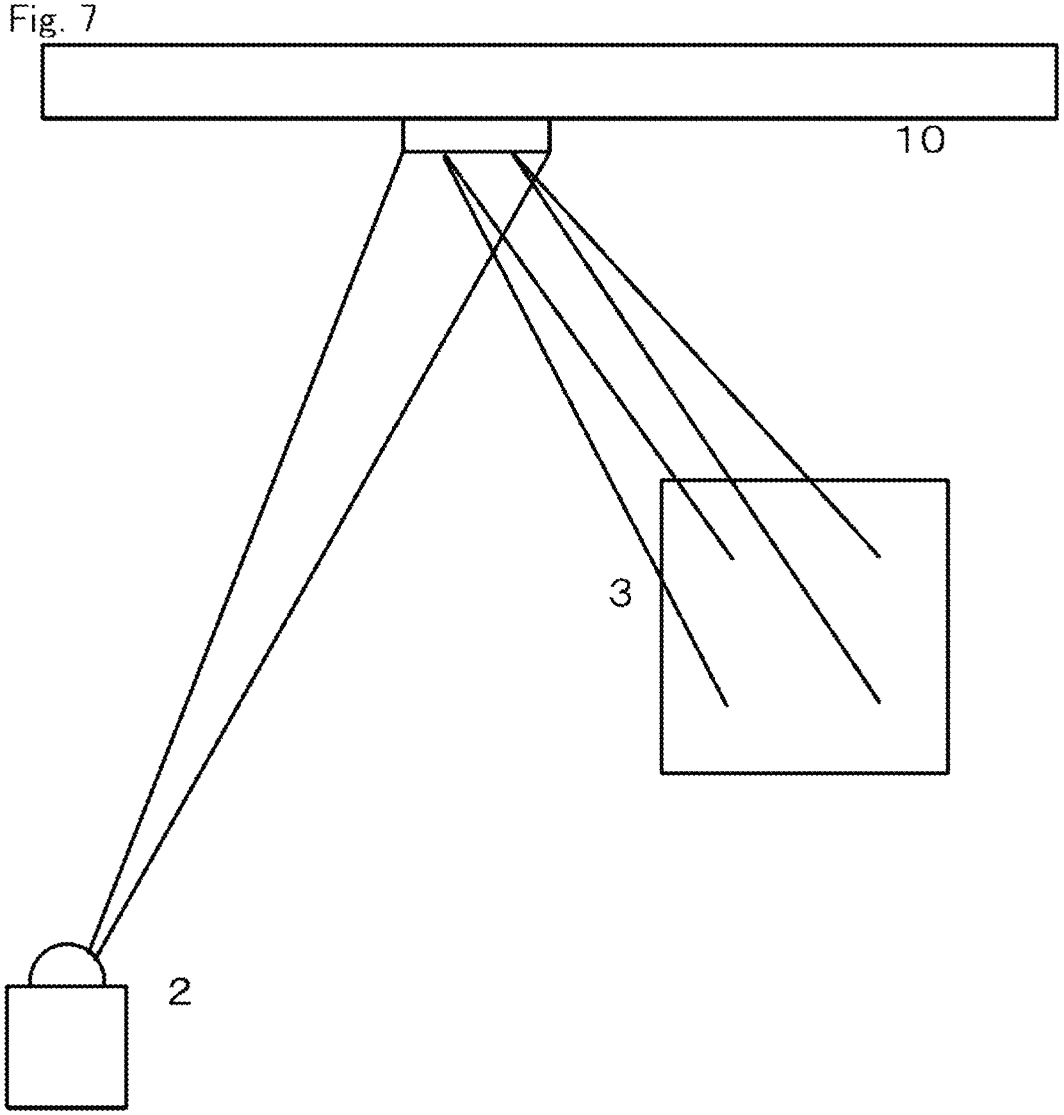
FIG. 7 shows a configuration example of a reflect array in one embodiment of the present invention.

In the embodiment shown in FIG. 7, the reflect array 10 transmits radio waves from the base station 2 used for communication to the reception area 3, and has a plurality of reflectors (1001-1004).

The reflector 100 has identical cells 110 arranged at predetermined intervals.

At least two of the plurality of reflectors (1001-1004) have the identical cells 110 arranged at different intervals and have different reflection angles.

Then, the reception area 3 is configured making us of different reflection angles.

In this embodiment, the reception area 3 is configured with two different reflection angles in the horizontal direction and two in the vertical direction.

Figure 8:
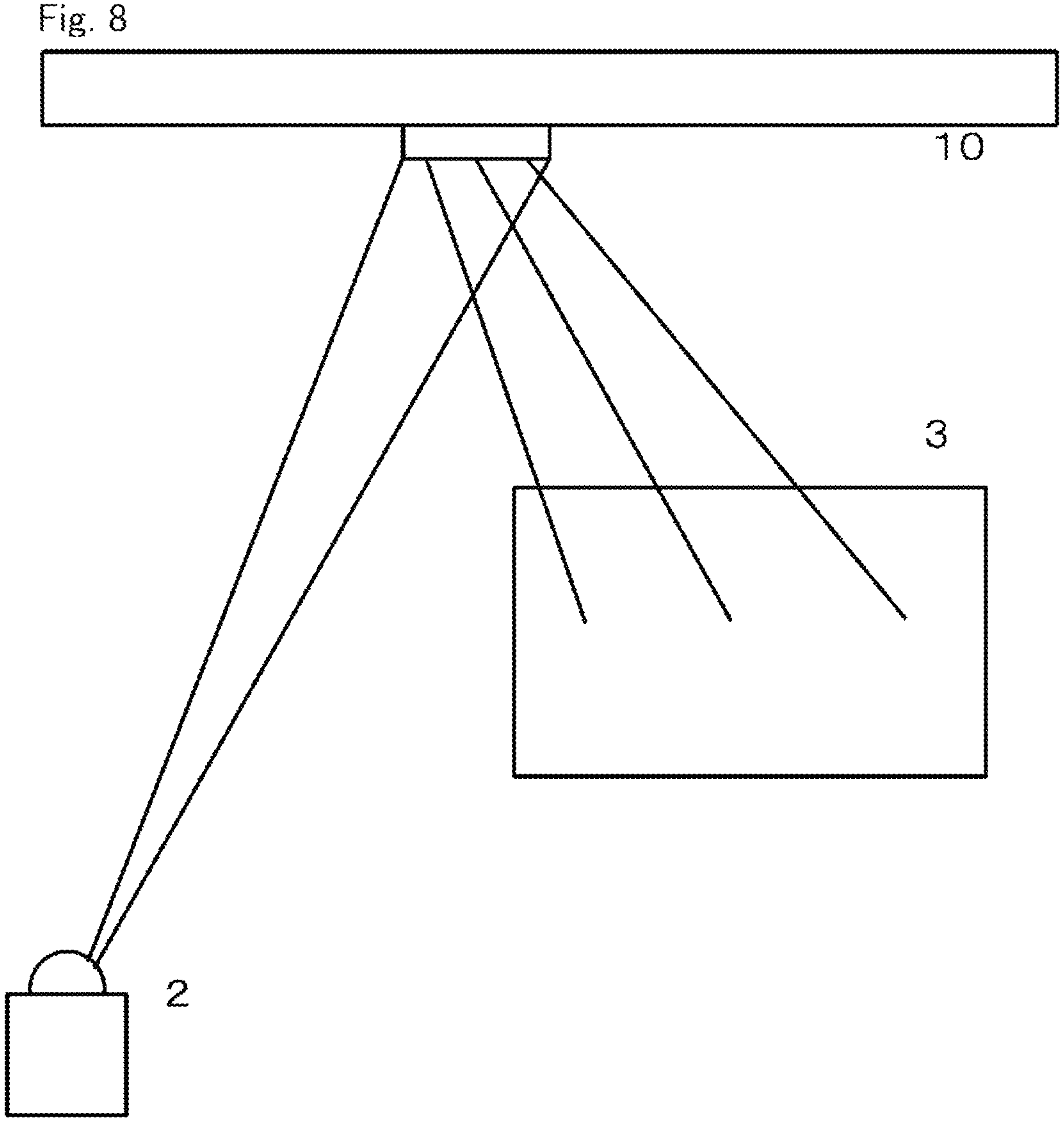
FIG. 8 shows a configuration example of a reflect array in one embodiment of the present invention.

FIG. 8 shows the configuration of the reflect array 10 in one embodiment of the present invention.

In this embodiment, the reception area 3 is configured with three or more reflectors 100 having different reflection angles by substantially constant angles.

A method of designing the reflect array 10 described above will be described as an embodiment of the present invention.

In this embodiment, in the preparation step S30, the plurality of reflectors 100 with different reflection directions have the identical cell 110. The plurality of reflectors 100 with different reflection directions have the identical cells 110 arranged at different intervals for each reflector 100 with different reflection directions.

In one embodiment of the present invention, the method for designing the reflect array 10 arranges three or more reflectors 100 whose reflection directions differ by substantially constant angles in the arrangement step S40.

A wide beam is realized by unitizing and arranging the reflectors 100, making the design easier, concerning to the problem that various design parameters of the reflector 100 are required depending on the size of the area and the distance to the reflectors 100 for transmission and reception which leads to high cost. In other words, the design can be facilitated by preparing a plurality of units of reflector plates 100 for narrower beams with different reflection directions that provide the required gain, and by determining the number of units and arranging them so as to obtain the required beam width.

For the sake of reducing the design cost of the reflect array 10, it is possible not only to use multiple beams, but also to use them in the near area.

Figure 9:
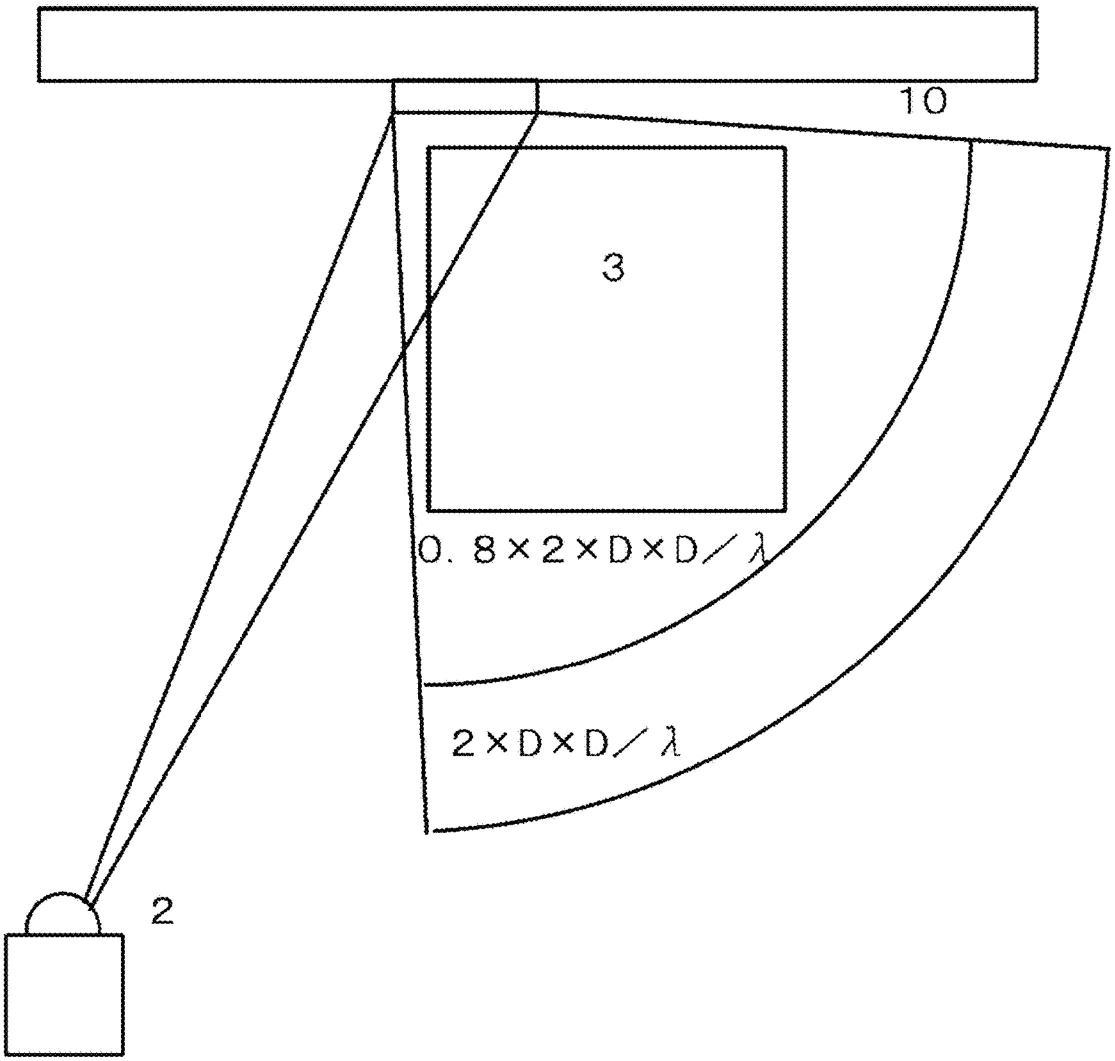
FIG. 9 shows a configuration example of a reflect array in one embodiment of the present invention.
Figure 10:
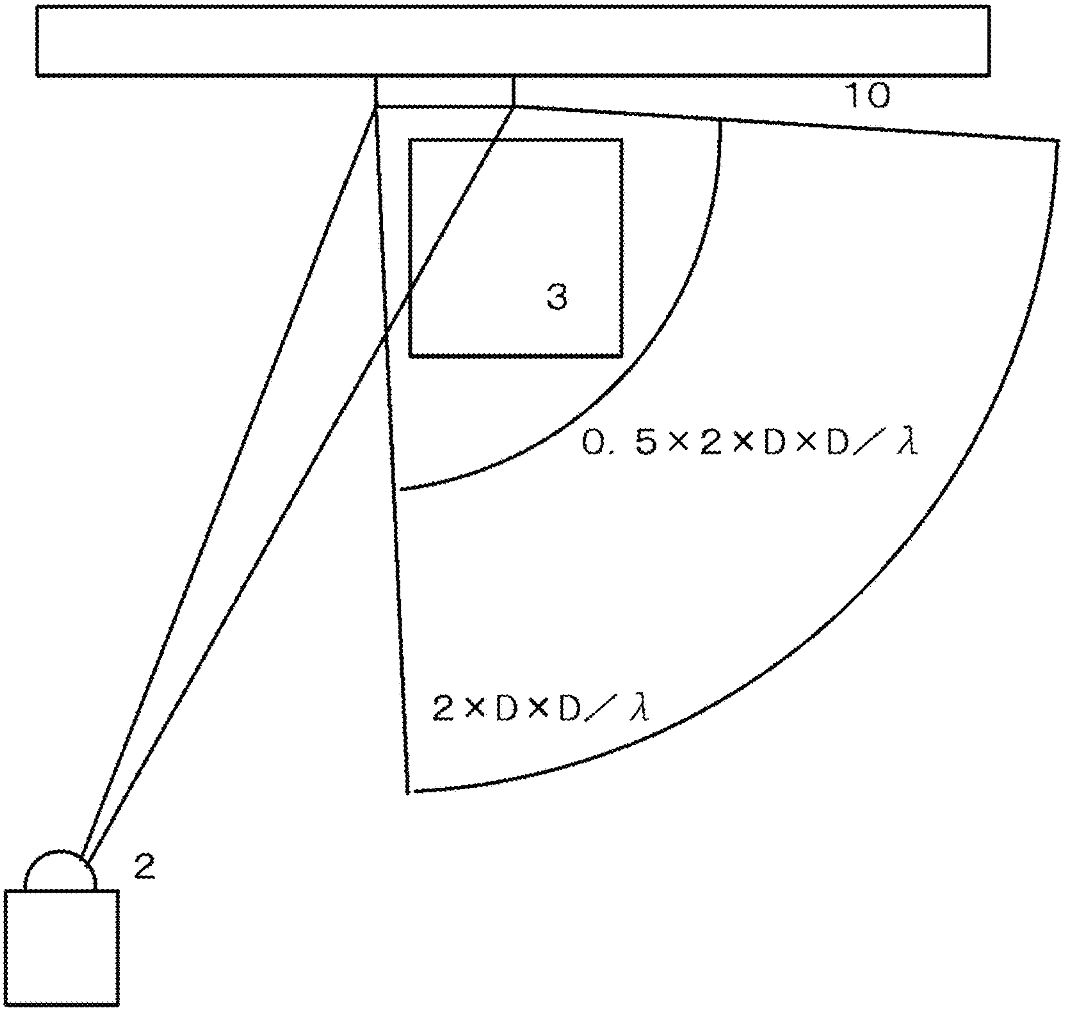
FIG. 10 shows a configuration example of a reflect array in one embodiment of the present invention.

FIGS. 9 and 10 show configuration examples of the reflect array 10 in one embodiment of the present invention.

The aperture size of the reflect array 10 is set so that the reception point such as the position to be made into the target area or the transmission point of the base station 2 or the like is in the near field. In other words, the reflector 100 is designed to have an aperture dimension such that the distance from the reflector 100 satisfies that 2×D×D/λ is larger or equal to transmitting/receiving point positions. Here, the reflect array 10 radiates from a plane rather than from a point like an aperture antenna such as a parabolic antenna.

In this embodiment, the beam can be widened by using the large reflector 100.

Installation is implemented with the reflector is positioned where the incident angle varies. Incidents from below are reflected upwards, incidents from above are reflected downwards, and vertically incident beams are vertically reflected, resulting in a wide-angle beam when combined.

In the near field, since there is a path difference between the central part and the edge of the reflector 100, the phases are not aligned and the target area is formed in the wide-angle direction, a wide-angle reflection area can be provided by using the near filed of the reflector 100 as the target are.

Figure 11:
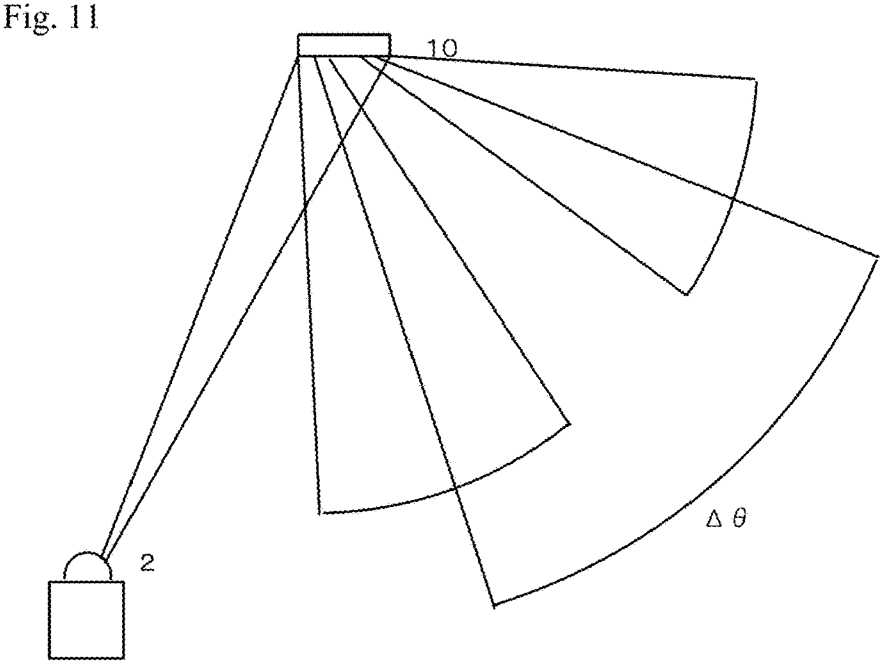
FIG. 11 shows a configuration example of a reflect array in one embodiment of the present invention.
Figure 12:
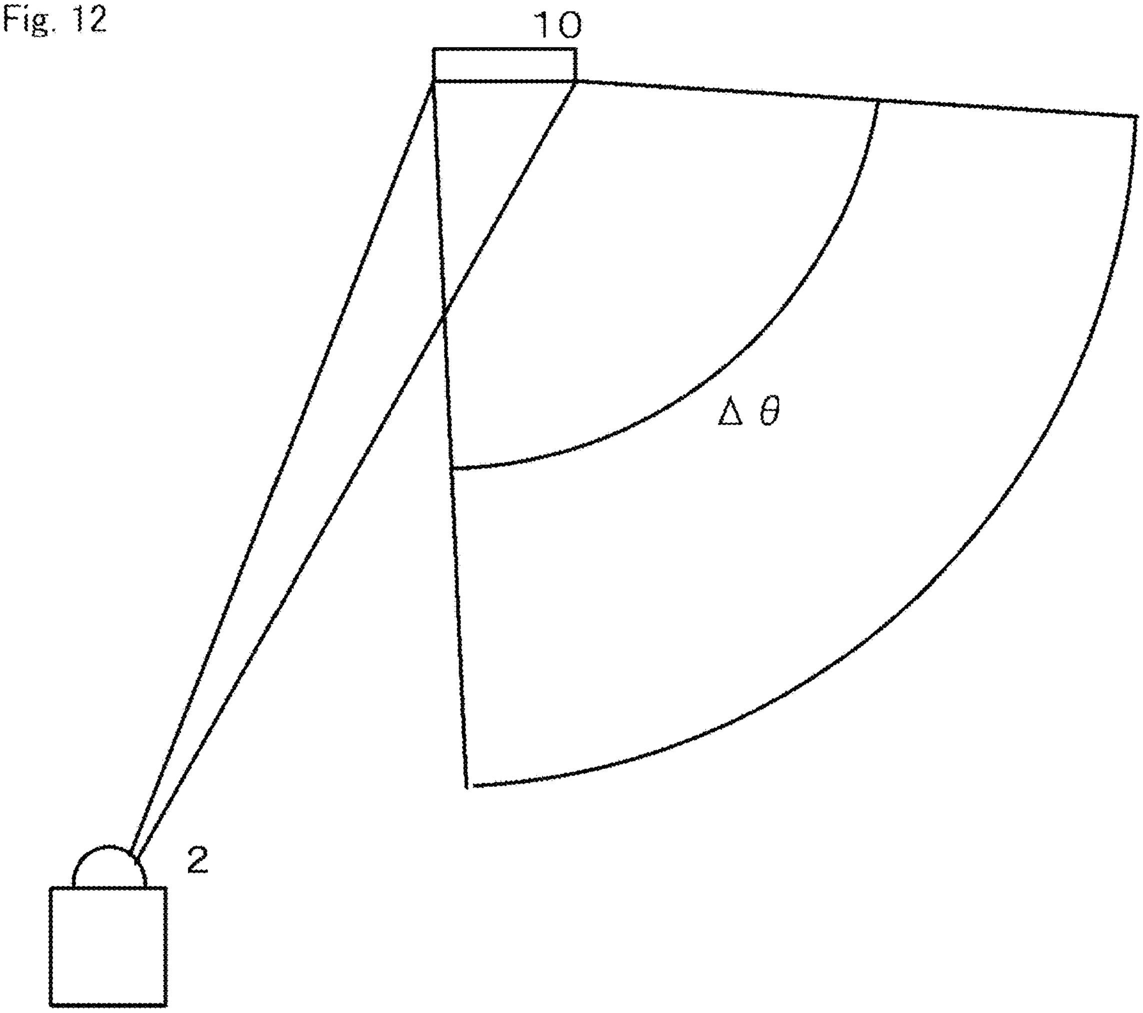
FIG. 12 shows a configuration example of a reflect array in one embodiment of the present invention.

FIGS. 11 and 12 show a configuration example of the reflect array 10 in one embodiment of the present invention.

In this embodiment, the reflection directions of the radio waves reflected on the reflector 100 can have two points different from each other by 30 degrees or more on the position of the reflector 100. By reflecting at a wider angle, a reception area 3 (reception area) is formed in a wider angle direction. FIG. 8 shows an example of a reflect array 10 having a plurality of reflectors 100 in which the reflection directions delta theta of two reflectors 100 differ by 30° or more. In addition to that, FIG. 9 shows a configuration in which the reflection directions differ by 30 degrees or more at two points on both ends of one reflector 100.

With this configuration, radio waves are reflected at a wide angle of 30 degrees or more in the near field, so wide-angle directivity can be achieved without lowering the gain.

Though the size of the reflector 100 can be selected according to the place of use so that the required beam width can be obtained at the distance to be used, a plurality of reflectors 100 can be discretely arranged alternatively. Here, "discretely" signifies that the reflectors 100 are arranged apart from each other.

Figure 13:
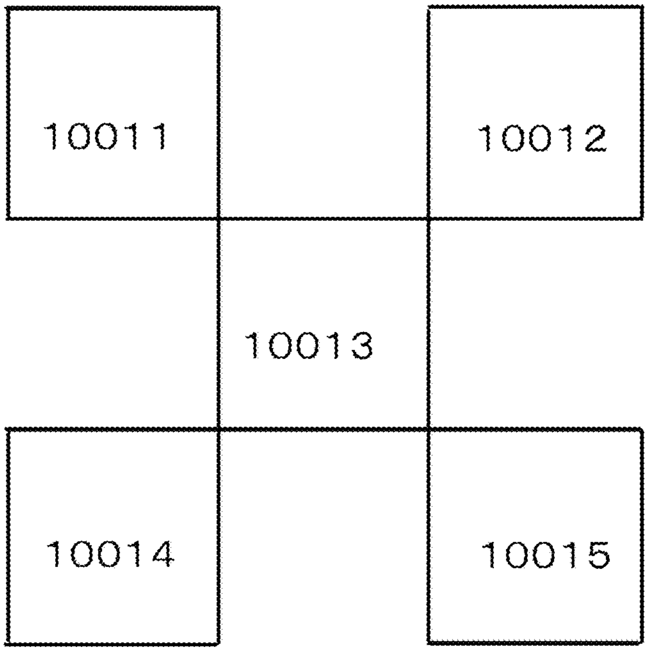
FIG. 13 shows a configuration example of a reflect array in one embodiment of the present invention.

FIG. 13 shows a configuration example of a reflect array 10 in which a plurality of reflectors 100 are discretely arranged. In this embodiment, the plurality of reflectors 100 are arranged in a lattice with gaps between them.

With this configuration, instead of the large reflector 100, a plurality of reflectors (10011 to 10015) can be used to achieve wide-angle directivity.

Although it is necessary to position the reflectors 100 discretely or use a large reflector 100, the design becomes significantly easier if the space can be secured.

In one embodiment, reflector 100 can be one or more metasurfaces.

Figure 14:
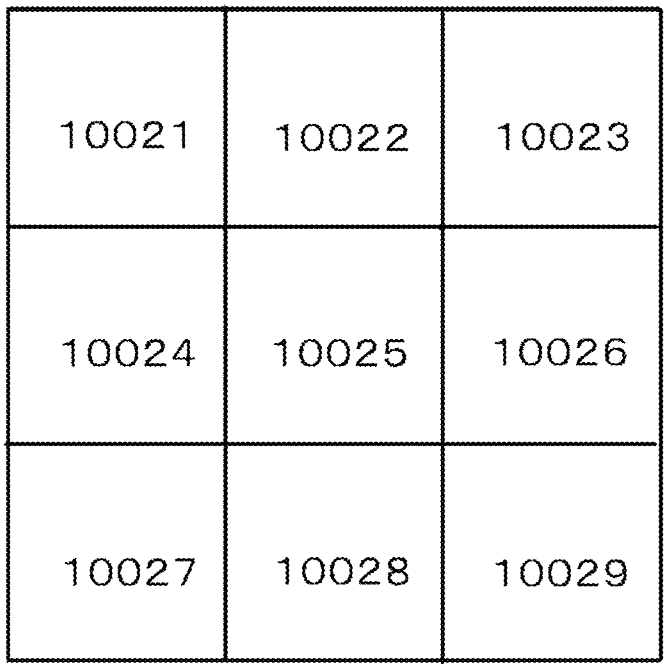
FIG. 14 shows a configuration example of a reflect array in one embodiment of the present invention.

FIG. 14 shows a configuration example of a reflect array 10 having a plurality of metasurface reflectors (10021-10029).

The metasurface can adjust the direction of incidence or reflection of radio waves in the desired direction.

In one embodiment, the reflector 100 is placed substantially on one plane as shown in FIG. 11.

The entire reflect array 10 can be arranged substantially on one plane. In particular, when a plurality of metasurface reflectors 100 are used, the direction of incidence or reflection of radio waves can be adjusted in a desired direction by the reflectors 100 arranged on the same plane.

In one embodiment, reflector 100 may include metal reflector 120.

The reflector 100 may be not only the reflect array 10 but also the metal reflector 120. By using the lower-cost metal reflector 120, costs, including manufacturing costs, can be reduced.

Figure 15:
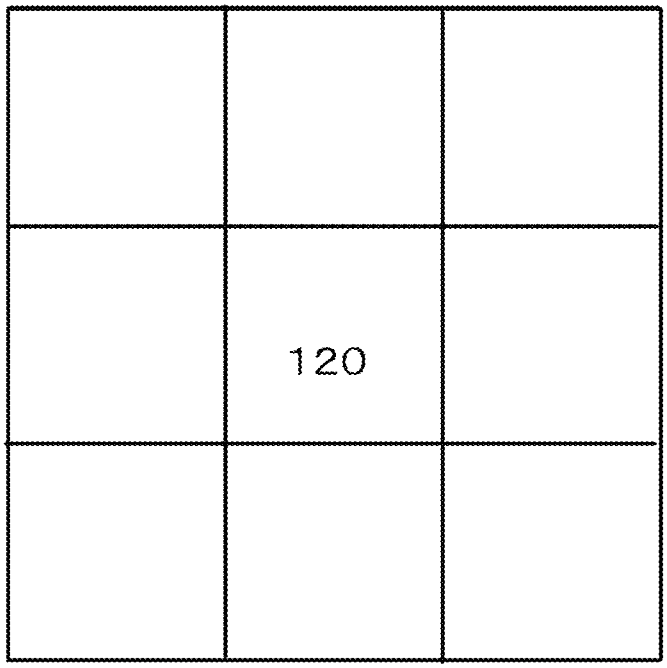
FIG. 15 shows a configuration example of a reflect array in one embodiment of the present invention.

FIG. 15 shows a configuration example of a reflect array 10 having a metal reflector 120 and a metasurface reflector 100.

Alternatively, one metal reflector 120 may be placed in the near field.

Figure 16:
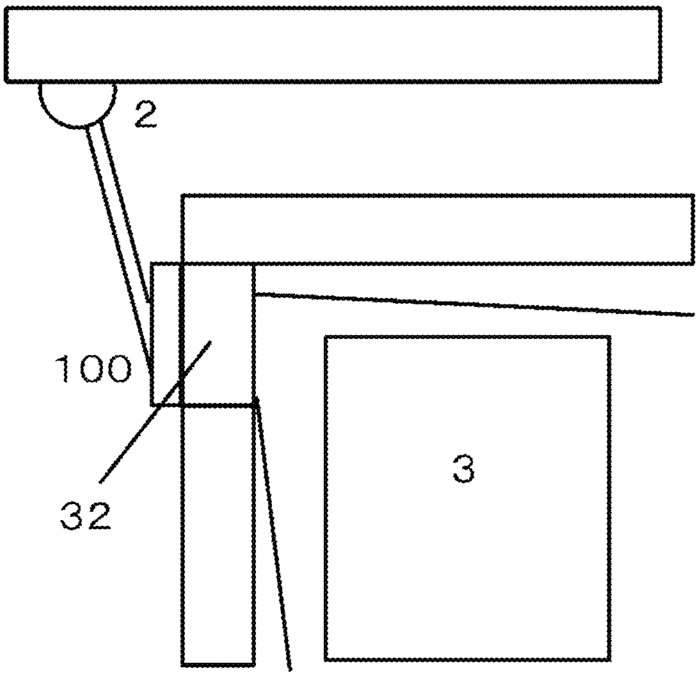
FIG. 16 shows a configuration example of a reflect array in one embodiment of the present invention.

FIG. 16 shows a configuration example of the reflect array 10 in one embodiment of the present invention.

In this embodiment, the reflector 100 is of a transmissive type configured to be attached to glass.

With this configuration, the wide-angle directivity reflect array 10 can be realized by using the indoor glass window 32 or the like. Needless to say, besides glass, it can also be attached to materials that transmit radio waves.

In one embodiment, the reflector 100 is a wall material fake type such as building material pasted, or a signboard fake type.

Figure 17:
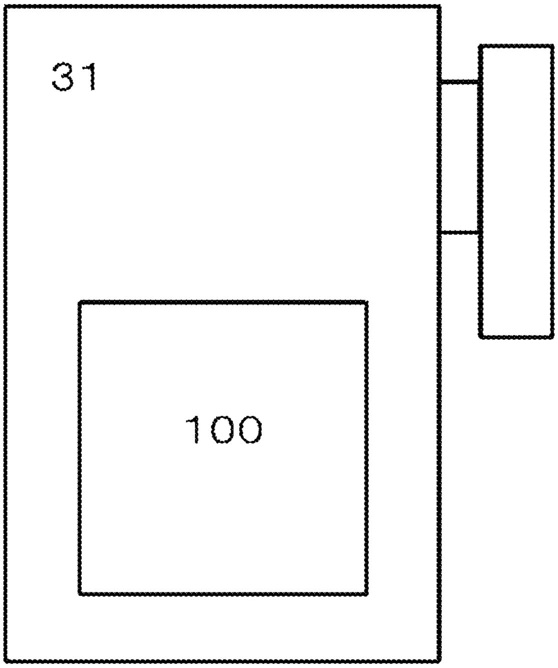
FIG. 17 shows a configuration example of a reflect array in one embodiment of the present invention.

FIG. 17 shows a configuration example of the reflect array 10 having the wall material fake reflector 100 installed on the wall surface of the building 31 and the signboard fake reflector 100 installed on the back surface of the signboard.

The wall material fake type reflector 100 can be configured not only outdoors but also on an indoor wall surface. Since it is easy to secure a large area on the outer wall surface and the inner wall surface of the building 31, a plurality of reflectors 100 or the reflect array 10 that reflects radio waves in the near field can be easily installed. In addition, the signboard fake type reflector 100 can be configured on the surface, and in this case, since it is easy to secure a large area for the signboard, a plurality of reflectors 100 or a reflect array 10 that reflects radio waves in the near field can be easily installed.

With this configuration, a wide-angle directivity reflect array 10 can be realized in the city or indoors.

Figure 18:
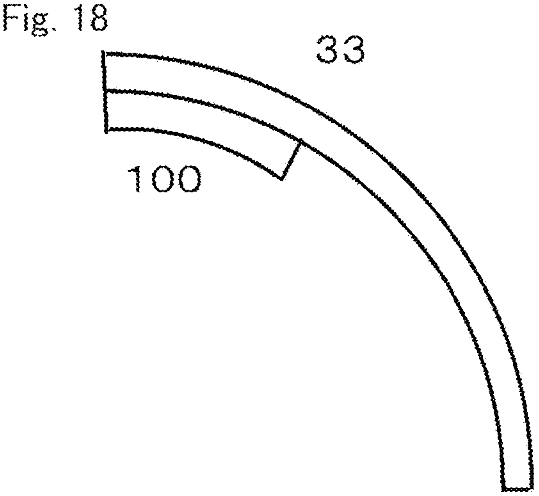
FIG. 18 shows a configuration example of a reflect array in one embodiment of the present invention.

FIG. 18 shows a configuration example of the reflect array 10 in one embodiment of the present invention.

In this embodiment, the reflecting plate 100 is of a cover-inside mounting type.

Since the cover is composed of a plurality of flat surfaces or a surface having a constant curvature is often used, the design of the reflect array 10 is easy and at the same time, a surface that is rarely used can be used.

Figure 19:
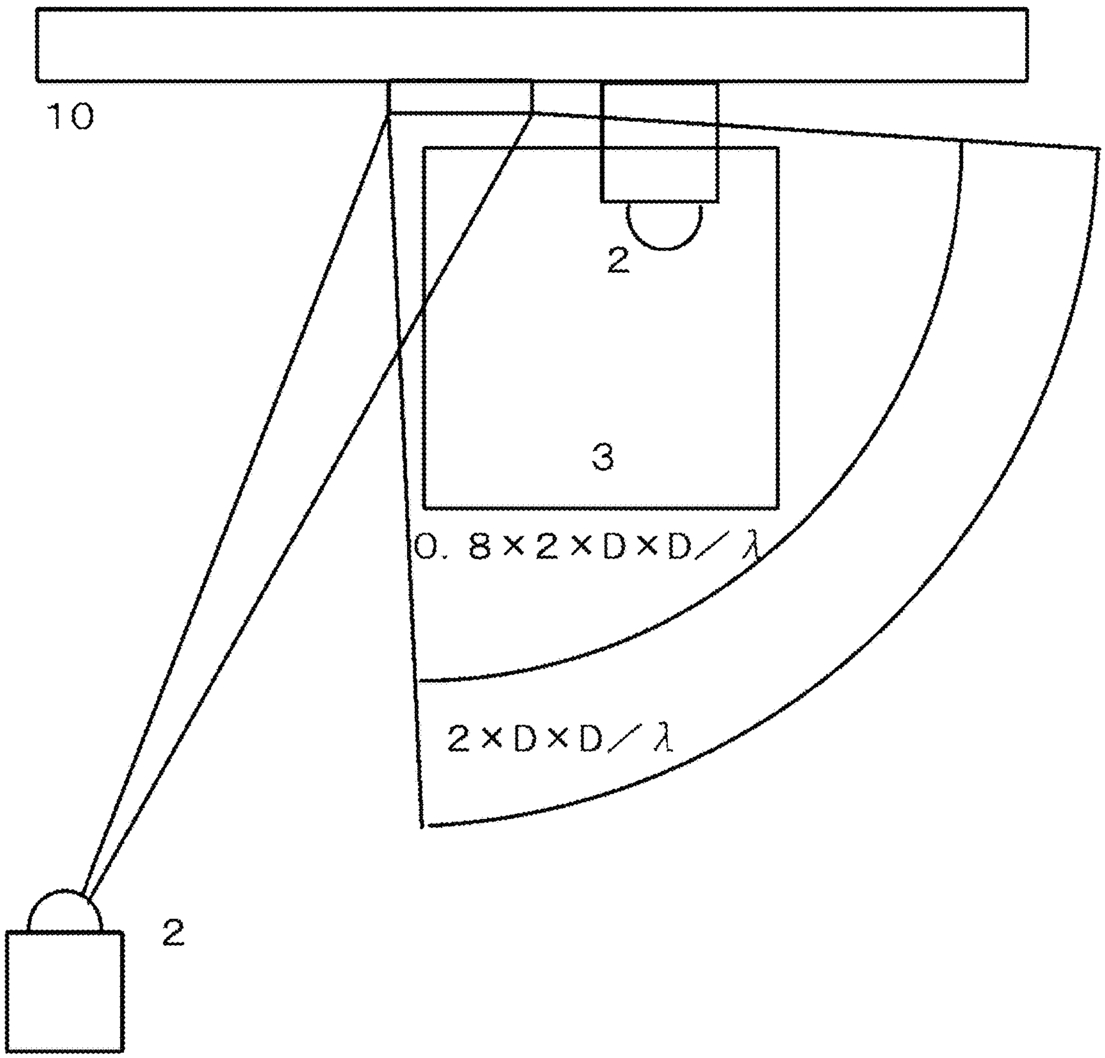
FIG. 19 shows a configuration example of a reflect array in one embodiment of the present invention.

FIG. 19 shows a configuration example of the reflect array 10 in one embodiment of the present invention.

In this embodiment, the reflect array 10 is made of flexible material.

With this configuration, the wide-angle directivity reflect array 10 can be realized in various places such as the inside of the cover 33.

Next, the reflect array system 1 in one embodiment will be described.

Figure 20:
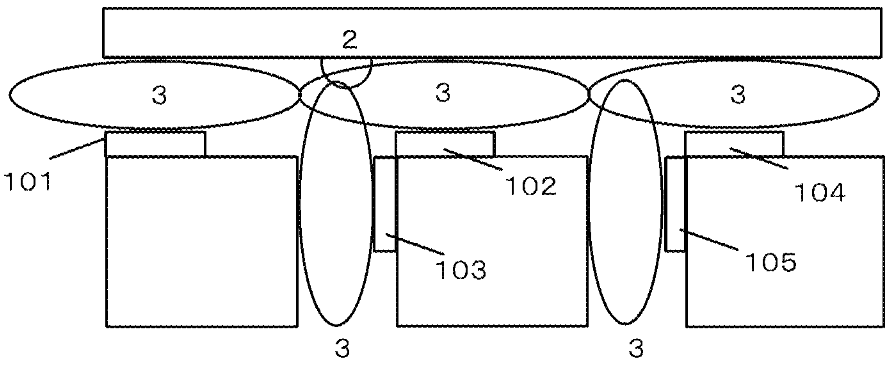
FIG. 20 shows a configuration example of a reflect array system in one embodiment of the present invention.

FIG. 20 shows a configuration example of the reflect array system 1 in one embodiment of the present invention.

In this embodiment, the reflect array system 1 has a plurality of reflect arrays 10 described above. Specifically, it has five reflect arrays.

Each reflect array (101-105) has nine reflectors (10021-10029) as shown in FIG. 5.

A total of 45 reflectors 100 are configured by combining nine or less types of reflectors 100.

In this way, where M is the average number of reflectors 100 used in each reflect array 10, the total number of reflectors 100 included in all N reflect arrays 10 is M*N/5 or less.

Normally, it is necessary to design MN reflectors 100, but since the reflectors 100 are designed with one-fifth or less, the cost can be reduced. Furthermore, since the previously designed reflector 100 is used in combination, the design cost can be significantly reduced.

In addition, by making the directivity wide-angle, it is possible to standardize the reflector design and reduce the total steps of the designing.

It goes without saying that the present invention is not limited to the above-described embodiments and includes various embodiments without departing from the spirit and scope of the present invention.

For example, such a configuration is possible where more than one reflection is utilized, where, after the radio wave from the base station 2 is reflected by the above-described reflect array 10, the radio wave is delivered to the receiving area 3 via another reflector 100, and so on.

EXPLANATION OF REFERENCE NUMERALS

1 reflect array system
10, 101 to 105 reflect array
100, 1001 to 1004, 10011 to 10019, 10021 to 10029 reflector
110 cell
120 metal reflector
2 base station
3 receiving area
31 building
32 window
33 cover

The invention claimed is:

1. A design method of a reflect array,
where the reflect array is configured to transmit radio wave from a base station to a reception area, comprising:
a gain setting step for setting necessary gain, containing both of distance information between the base station and the reflect array, and distance information between the reflect array and the reception area;
a width setting step for setting a beam width, the beam width is necessary to cover the reception area;
a preparation step for preparing a plurality of reflectors having differing reflection direction from each other; and
an arrangement step for arranging the plurality of reflectors, the arrangement step is executed after the steps for setting and the preparation step, where a beam formed by the plurality of reflectors satisfies the necessary beam width as a whole.

2. The design method of a reflect array according to claim 1, wherein
at the preparation step,
the plurality of reflectors, having differing reflection directions from each other, comprises identical cells,
the same cells are arranged at intervals, the intervals differ from the intervals of the reflectors having differing reflection directions.

3. The design method of a reflect array according to claim 1, wherein more than two reflectors, having differing reflection directions from each other, are arranged at the preparation step.

4. The design method of a reflect array according to claim 1, wherein
the width setting step comprises division setting step for dividing the reception area into a plurality of division areas, and
associating each division area with each reflector.

5. A reflect array, wherein the reflect array is designed by the design method according to claim 1.

6. The reflect array according to claim 5, wherein
the reflection directions of the radio waves, reflected on a reflector of the plurality of reflectors, have two points that are different from each other by 30 degrees or more on the position of the reflector of the plurality of reflectors.

7. The reflect array according to claim 5, wherein the plurality of reflectors are discretely arranged.

8. The reflect array according to claim 5, wherein a reflector of the plurality of reflectors is a metasurface.

9. The reflect array according to claim 5, wherein the reflectors are installed substantially on a plane.

10. The reflect array according to claim 5, wherein a reflector of the plurality of reflectors includes a metal reflector.

11. The reflect array according to claim 5, wherein a reflector of the plurality of reflectors is a transmission type configured to be attached to glass.

* * * * *